US009830369B1

(12) United States Patent
Ben-Natan et al.

(10) Patent No.: US 9,830,369 B1
(45) Date of Patent: Nov. 28, 2017

(54) PROCESSOR FOR DATABASE ANALYTICS PROCESSING (71) Applicants: Ron Ben-Natan, Lexington, MA (US); Ury Segal, Vancouver (CA)

(72) Inventors: Ron Ben-Natan, Lexington, MA (US); Ury Segal, Vancouver (CA)

(73) Assignee: JSONAR, INC., Lexington, MA (US)

( * ) Notice: Subject to any disclaimer, the term of this patent is extended or adjusted under 35 U.S.C. 154(b) by 739 days.

(21) Appl. No.: 14/276,135

(22) Filed: May 13, 2014

Related U.S. Application Data (60) Provisional application No. 61/855,339, filed on May 14, 2013, provisional application No. 61/826,482, filed on May 22, 2013, provisional application No. 61/858,752, filed on Jul. 26, 2013.

(51) Int. Cl.
G06F 17/30 (2006.01)

(52) U.S. Cl.
CPC .. G06F 17/30569 (2013.01); G06F 17/30312 (2013.01)

(58) Field of Classification Search
CPC .................................................. H04N 19/124
USPC ........................................................ 707/804
See application file for complete search history.

(56) References Cited

U.S. PATENT DOCUMENTS

| 6,310,883 | B1 * | 10/2001 | Mann ...................... | H04L 45/12 370/408 |
| 9,026,405 | B2 * | 5/2015 | Buckley .............. | G06F 17/5004 703/1 |
| 9,137,336 | B1 * | 9/2015 | Zalunin ................... | H04L 69/04 |
| 2013/0315493 | A1 * | 11/2013 | Sato ....................... | G06T 9/007 382/232 |

* cited by examiner

Primary Examiner — Baoquoc N To
(74) Attorney, Agent, or Firm — Chapin IP Law, LLC (57) ABSTRACT An analytics processing system generates analytics from a collection of unstructured data by. transforming a received source of input data from an unstructured database into a delimiterless form, and iteratively moving portions of the delimiterlesss input data from a solid-state memory to a shared memory adapted for parallel operations with a plurality of GPU cores. The method stores computational data, such as values for matching, in a high speed memory responsive to operations with the shared memory, in which the high-speed memory remains static for the duration of the iterations. A host CPU invokes the plurality of cores for performing the parallel operations on the computational data and the portions of the delimiterless input data, and stores a result in a general memory accessible from a graphical user interface (GUI). The GPU cores parallelize the matching task of the input data from the unstructured database against the match data.

18 Claims, 4 Drawing Sheets

PROCESSOR FOR DATABASE ANALYTICS PROCESSING

RELATED APPLICATIONS

This patent application claims the benefit under 35 U.S.C. §119(e) of U.S. Provisional Patent App. No. 61/855,339, filed May 14, 2013, entitled "EFFICIENT BIG DATA PROCESSING USING GPUS," U.S. Provisional Patent App. No. 61/826,482, filed May 22, 2013, entitled "EFFICIENT BIG DATA MATCHING USING GPUS," and to U.S. Provisional Patent App. No. 61/858,752, filed Jul. 26, 2013, entitled "SYSTEM AND METHOD FOR PERFORMING CONCURRENT OPERATIONS USING GPUS," all incorporated by reference in entirety.

BACKGROUND

Unstructured databases are becoming a popular alternative to conventional relational databases due to the relaxed format for data storage and the wider range of data structures that may be stored. In contrast to conventional relational databases, where strong typing imposes data constraints to adhere to a predetermined row and column format, unstructured databases impose no such restrictions.

Unstructured databases have no formal field or record structure, and may be more accurately characterized as a collection of facts. Unlike their structured counterparts, typically a SQL (Structured Query Language) database, which denotes data in fixed length fields enumerated in records in a tabular form, an unstructured database labels fields for storing values in a document. A set of documents defines a collection, in which the documents in a collection may share some, none, or all of a particular field. Due to the unstructured nature, however, conventional analytical approaches for generating and analyzing trends may not lend themselves well to an unstructured database. Since there are effectively no formal bounds or range, it can be difficult to analyze or extract conclusory results, due to computational intensity or complexity. Queries directed to unstructured databases may invoke substantial computations resources in traversing a volume of unstructured data in an effort to satisfy the requested query.

SUMMARY

A query server for an repository of unstructured data employs Graphical Processing Units (GPUs), often employed for high-resolution graphics processing due to the larger number of repetitive operations demanded, as a computing basis for queries of unstructured data. Due to the flexibility of field designations, and the absence of pre-defined or cyclic field structures, conventional field indexing and computed field positions may be ineffective in unstructured databases. Accordingly, query processing may need to traverse large ranges of memory and perform matching or comparison operations in a repetitive manner. When combined with solid state storage mediums such as NAND memories and flash drives, an IO (Input/Output) bottleneck is alleviated, allowing query processing of unstructured data in an expedited and efficient manner.

Modern trends driving ever-increasing capabilities to capture and store data make it possible to analyze vast expanses of information, and thus the demand for processing large data volumes is constantly growing. This area, often referred to as "Big Data," is compelling as much as it is difficult to implement. It would be difficult to find a modern company that does not attempt to aggregate terabytes and even petabytes of data in order to run analytical algorithms, queries and reports in order to gain insight into the business, in order to create new revenue streams and improve customer satisfaction and profitability.

Configurations herein describes a "Big Data" analytical system that makes use of GPUs and SSD (Solid State Devices) such as flash memory to provide the computational power and response times of massively-large clusters using very small clusters of computers. The system stores structured, unstructured or semi-structured data as a columnar representation of JSON (Javascript Object Notation) data on a small cluster or even on a single computer. It applies parallel processing using a few machines with GPUs to this columnar JSON representation, supporting analytic processing that can take hundreds and thousands of nodes using conventional approaches.

A system and method for processing unstructured data as discussed further below includes transforming a received source of input data from an unstructured database into a delimiterless, or columnar, form, and iteratively moving portions of the delimiterless input data from a solid-state memory to a shared memory adapted for parallel operations with a plurality of cores. The "delimiterless" form refers to a sequential string of concatenated data, such as Unicode characters, with field definition characters such as brackets, commas and periods removed, thus appearing as a single "column" of data. GPUs are often deployed as multiple cores on a single board, however typically have substantially more cores than a conventional multiple core CPU arrangement. The method stores computational data, such as values for matching or comparison, in a high speed memory responsive to operations with the shared memory, in which the high-speed memory remains static for the duration of the iterations. A host CPU invokes the plurality of cores for performing the parallel operations (matching or comparisons) on the computational data and the portions of the delimiterless input data, and stores a result in a general memory accessible from a graphical user interface (GUI). The GPU cores parallelize the matching task of the input data from the unstructured database against the match data in the constant (high-speed) memory, and render a result to a user indicative of the performed operations.

While data within the enterprise and data in the cloud used by companies has traditionally been structured and sitting inside relational database management systems (RDBMSs), much of the growth in data is unstructured and semi-structured in the form of documents, files, JSON and more. Big Data problems usually comprise of all kinds of data—structured, semi structured and unstructured, all of which needs to be analyzed together. The variety of formats coupled with the volume of data, the speed by which this data needs to be acquired and processed, and the varied sources, lineage, truth of data sources that need to be represented in the data are sometimes called the four Vs of Big Data—Volume, Variety, Velocity and Veracity.

Before Big Data came along, most companies were handling analytics using relational data warehouses running on large computers, usually with many nodes and a handful of CPUs/cores per node. But the scale was contained—it was easy to find warehouses using tens of nodes and some companies had very large warehouses of hundreds of nodes. These systems used expensive hardware, expensive processors, expensive disks—they were very expensive. And, they could not be used to support the scale of what is considered Big Data problems today.

However, what we have observed is that this approach is too difficult for the typical company. While the iconic entities GOOGLE® and FACEBOOK® may have the technical prowess, justification and deep pockets to build and maintain such an undertaking, most companies are not. For example, Google maintains a 10,000 node cluster for their Dremel analytics—there are few companies in the non-Internet industry that can afford to do so, and the same is true even for a 1000 node cluster.

The costs and complexities are many but two stand out clearly as a hurdle. First, maintaining such a cluster is expensive and complex. Second, the methods used to build parallel algorithms are complex and difficult to implement. The typical data analyst or even programmer may not perform such tasks efficiently. Companies therefore often find that they can build these clusters but then find them too hard to maintain and too hard to use. They therefore are often a wasted investment.

Even the so-called "Cloud Computing" approaches have no good answer to scaling processing for large quantities of unstructured data. While it is true that many companies view the cloud as a way to get these large-scale analytical services, this model just moves the complexity to the cloud providers. If a cloud provider needs to support large-scale Big Data analytics for a thousand clients, they might justify the expense of building several large clusters. But what happens if they need to support thousands or millions of clients—the scale of the clusters needed would be substantially complex and expensive to manage.

Configurations herein are based, in part, on the observation that conventional approaches to database processing rely on conventional indexing in tabular databases (such as relational databases) for traversing and comparing key fields in response to a query request. Unfortunately, conventional approaches suffer from the shortcoming that query processing in unstructured databases cannot perform field accesses through computation and indexing, and often needs to traverse or parse data manually for satisfying query requests, often a computationally intensive undertaking for conventional CPUs. Such unstructured databases may also represent multidimensional databases with a number of dimensions that further increases computability demands. Configurations herein substantially overcome the above-described shortcomings of unstructured database traversal by employing GPUs in conjunction with solid-state memory for quickly and efficiently performing the repetitive operations associated with traversing and matching a large repository of unstructured data.

A graphic processing unit (GPU) is a specialized electronic circuit designed to rapidly manipulate and alter memory to accelerate the creation of images in a frame buffer intended for output to a display. GPUs (sometimes also called visual processing units VPUs) are commonplace among high-resolution displays, graphics acceleration, 3D graphics and more.

While GPUs are mostly related to graphic processing, in essence they place a very large number of processing cores on a single card and therefore have the ability to perform massively parallel computation. As an example, a modern Central Processing Unit (CPU) can have 4, 8, 12 or even 16 cores in high-end CPUs. But a GPU can easily have 4096 cores, all available for computation tasks. And while traditionally these were screen-related tasks, it is increasingly common to use these units for general computation. This is sometimes called general purpose graphics processing unit (GPGPU) and the idea is to turn the massive computational power of a modern graphics accelerator pipeline into a general-purpose computational engine.

Alternate configurations of the invention include a multiprogramming or multiprocessing computerized device such as a multiprocessor, controller or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations herein disclose an approach that is significantly simpler, cheaper and more usable than conventional approaches for processing Big Data problems. It is based on a number of recent technological advances made in hardware over the past few years to allow solving Big Data problems using very small clusters in contrast to conventional approaches.

Configurations herein employ the following:

1. GPUs that have a massive number of processing cores on a single chip and the associated General Purpose GPU (GPGPU) APIs and SDKs for GPUs. Nvidia's CUDA being an example. 2. Flash memory and SSD drives that make IO as fast or nearly as fast as memory speeds; and 3. Specialized software that makes use of this hardware to apply advanced analytics to JSON (JavaScript Object Notation) Big Data (or similar formats).

GPUs are significant for supporting the level of computational intensity expected. Configurations endorse the premise that the only way to handle Big Data is parallelism but do not require a solution of a cluster of many commodity nodes using general-purpose CPUs for processing. Since GPUs offer the ability to run a parallel algorithm on many cores simultaneously, configurations herein are able to solve big data problems with at least one order of magnitude less nodes. One particular vendor, NVIDIA®, of Santa Clara, Calif., designs cards having GPUs with thousands of processing cores, and promotes usage on a CUDA (Compute Unified Device Architecture) environment, which are particular suited for configurations herein.

A further reason that many nodes are needed in the conventional large cluster method is that IO takes a long time. Disk speeds are far lower than memory and CPU speeds and therefore IO has always been the bottleneck for data-intensive jobs. Only by distributing the data, and thus IO, to thousands of machines could you process all this data quickly. But modern advances in flash memory and SSD drives, and a corresponding drop in cost, it is now possible to build machines that can store many terabytes and access this data, in parallel, at memory-access speeds—without the need for many machines to do so. This shifts the pendulum back to the compute side. The combination of GPU and memory-speed (i.e. solid state) IO are significant features. The disclosed approach therefore combines GPUs and SSD/flash memory technology with general-purpose computers to support small clusters that can process many terabytes of data, running complex analytics in seconds.

Configurations herein store the data in an independent columnar format as a single dimensional string of commonly sized data entities, such as Unicode characters. Much of today's Web data is now managed as JavaScript Object Notation (JSON) and the disclosed configurations adopt JSON (or at least the JSON structure) as a native format and access language. But the disclosure is not limited to JSON nor is our method limited to this structure—it can take in data from relational formats, files, Hadoop systems etc. Internally, we store the data in a way that allows us to compress it and access it efficiently, in a way that we can pipeline massive amounts of data in parallel through the GPU, and in a way that is intuitive to the user. Loaders are available in the system to parallel-load terabytes of data into this format from multiple systems, formats and systems.

A particularly common operation in any data processing system is that of matching a set of values. Given a set of input data elements that need to be matched (e.g. a list of names, a list of keywords, a list of account numbers), a data processing system is often asked to scan data elements and match all occurrences with the input set.

For example, in a conventional relational database system (RDBMS) a table may store all information about order items in an order_item table. This order_item table may have columns such as a unique identified, the description of the order item, the price and quantity that were ordered. In large systems such an order_item table can be very large with billions and even trillions of entries aggregated over time. Depicted below is an example configuration of a system and application for performing such a matching task in a user based query system.

Figure 1:
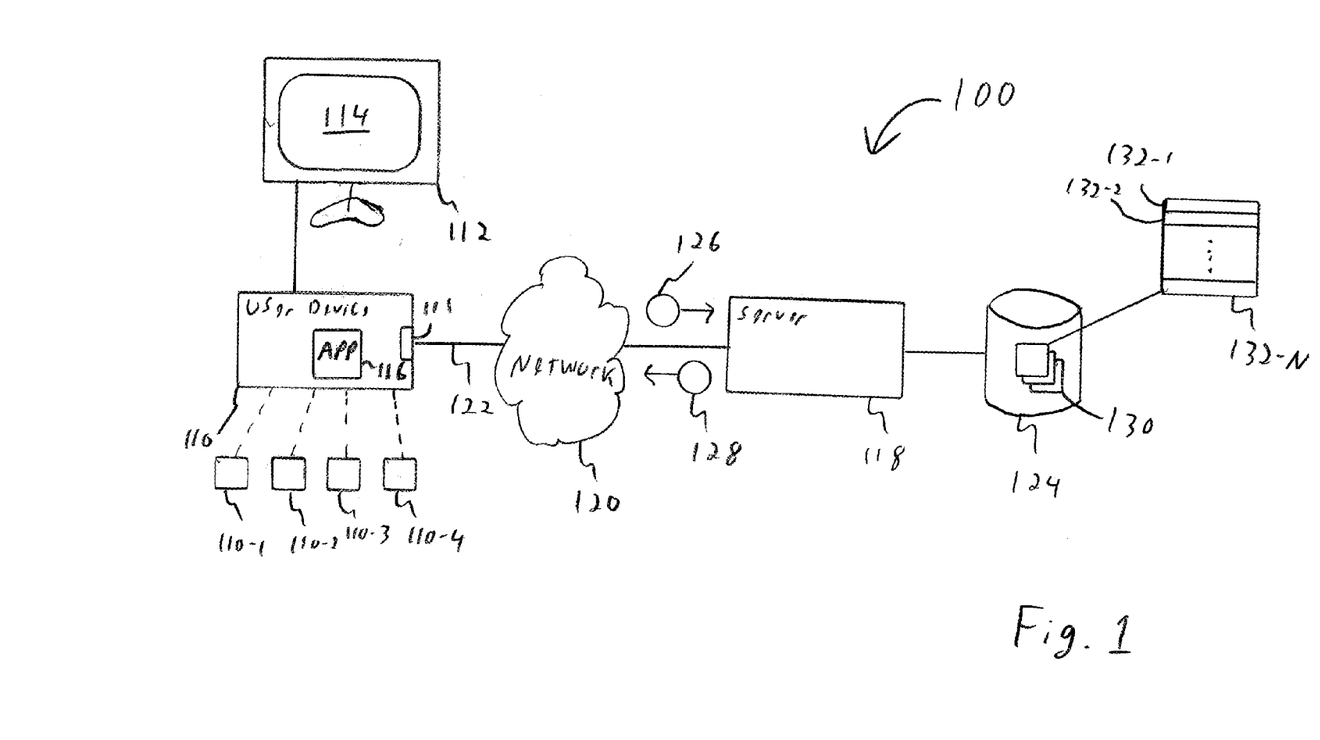
FIG. 1 is a context diagram of a computing environment suitable for use with configurations disclosed herein.

FIG. 1 is a context diagram of a computing environment 100 suitable for use with configurations disclosed herein. The configuration of FIG. 1 shows an example arrangement of computing devices for practicing the principles discussed herein, however any suitable network or local computer platform will suffice. Referring to FIG. 1, a user computing device 110 includes a visual display 112 for rendering a browser or other visual medium, an I/O (Input/Output) interface 111, and an application processor 114 for launching and executing an application 116 for user queries and responses. The visual display 112 present a graphical user interface (GUI) 114 for user interaction, and receives input from a user and renders responses to user queries, as discussed further below. Any appropriate device may be employed, such as mobile devices 110-1 (smartphones, tablets), laptops 110-2, desktops 110-3, or other computing device 110-4 suitable for user interaction, rendering and Internet connectivity. The application 116 interacts with a query server 118, which may be accessible via a public access network 120 such as the Internet. The query server 118 employs one or more network links 122, for accessing a database 124 having unstructured data stored in collections 130. Each collection includes a number of documents 132-1 . . . 132-n (132 generally). Using operations and methods disclosed further below, the application 116 issues a query request 126 from the user, and invokes the database servers 118 for generating a response 128 for rendering on the display 112.

The essence of the disclosure is the method by which the massively computational abilities of a GPU can be used to solve various Big Data problems in a short amount of time. Configurations herein give two concrete examples—solving the matching problem in a short amount of time and grouping records according to common field values in a short amount.

For the matching problem, the solution is enables by the fact that if there are N strings (or data items in the general case) in the population set and M strings in that input set and we need to output all strings in the population that match of the strings in the input set, then we are asked to so M×N calculations. If we perform this sequentially (e.g. on a CPU) then this will take M×N time slices. If we perform this in parallel on 4 CPUs (as an example) then we can do this in M×N/4 time. If we use a GPU that has 4096 cores, we can drastically cut down on the amount of time.

Configurations discussed below emphasize particular features of GPUs in contrast to CPUs. GPUs are not CPUs and for them to operate efficiently and indeed achieve massive parallelism, the algorithm used must be exact in allowing all threads spawned to work on separate data elements but in the same way. The algorithm should be such that all threads have work to do, that the processing is done whilst memory copies are done to prepare the next batch of work, and that as much of the GPU is used as possible.

The description proposes one such possible implementation below, however those skilled in the art can infer additional similar algorithms using the same techniques as shown below to make efficient use of GPUs for the matching problem.

Figure 2:
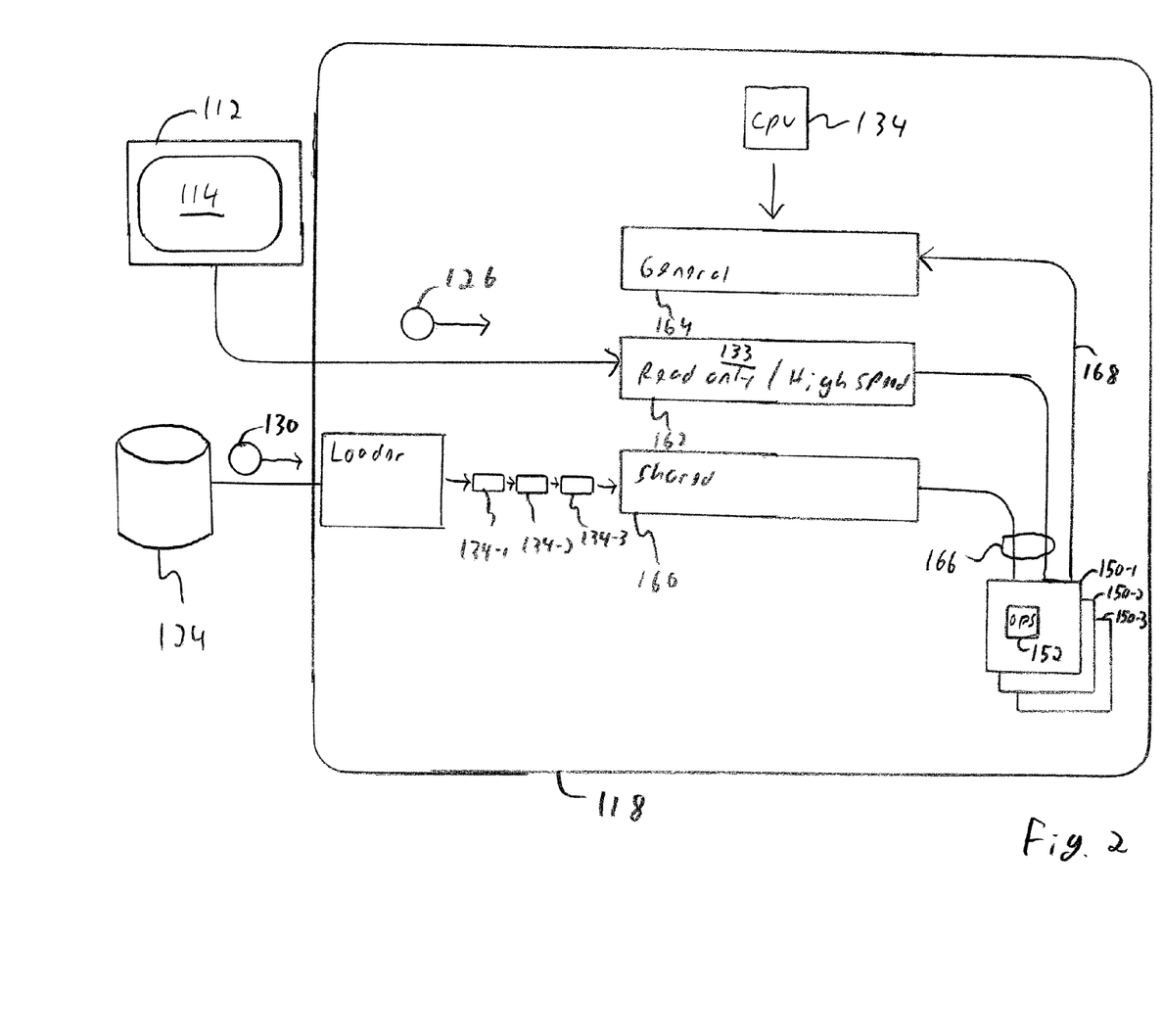
FIG. 2 is a block diagram of a query server in the environment of FIG. 1.

FIG. 2 is a block diagram of the query server 118 in the environment of FIG. 1. Referring to FIGS. 1 and 2, in a particular configuration, the query server 118 receives the query request 126 from the user device 110 via the GUI 114. The query server 118 includes a general purpose CPU (central processing unit) 134 and one or more GPUs (Graphical Processing Units) 150-1 . . . 150-N (150 generally), depicting GPU cores in a multi-core GPU board. The GPUs 150 are responsive to the CPU 134 for invocation on query tasks following setup and initialization, as discussed below. The GPUs 150 are particularly suited for parallel operations on data stored in specialized memories in the server according to a predetermined sequence of operations. A shared memory 160 is accessible to a plurality of the GPUs 150 for performing the operations 152, and may be somewhat limited in size, such as 64 k. A constant memory 162 is a high speed memory suited for read-only operations following the setup and initialization period. A general memory 164 stores other tasks and related data for setup and other uses. The GPUs 150 perform operations 152 on data in the shared memory 160 and the high speed memory 162 in a massively parallel form that is substantially faster than the general purpose CPU 134.

For example, in a particular usage case, employing collections 130 from the unstructured database 124, the GPUs 150 compare portions 131-1 ... 131-3 (131 generally) of the collection 130 with match terms 133 stored in the high speed memory 162. The CPU extracts the match terms 133 from the user query 126, and the collection 130 is searched for a match by each of the GPUs in parallel by comparing the shared memory 160 to the high speed memory 162 via an input stream 166 to the GPUs. The GPUs 150 return results 168 of the matching to the general memory 164 or the CPU 134 for specific indexing and field location and identification of the matched terms, as discussed below, and subsequently compute the query results 128 for rendering on the GUI 114.

Figure 3:
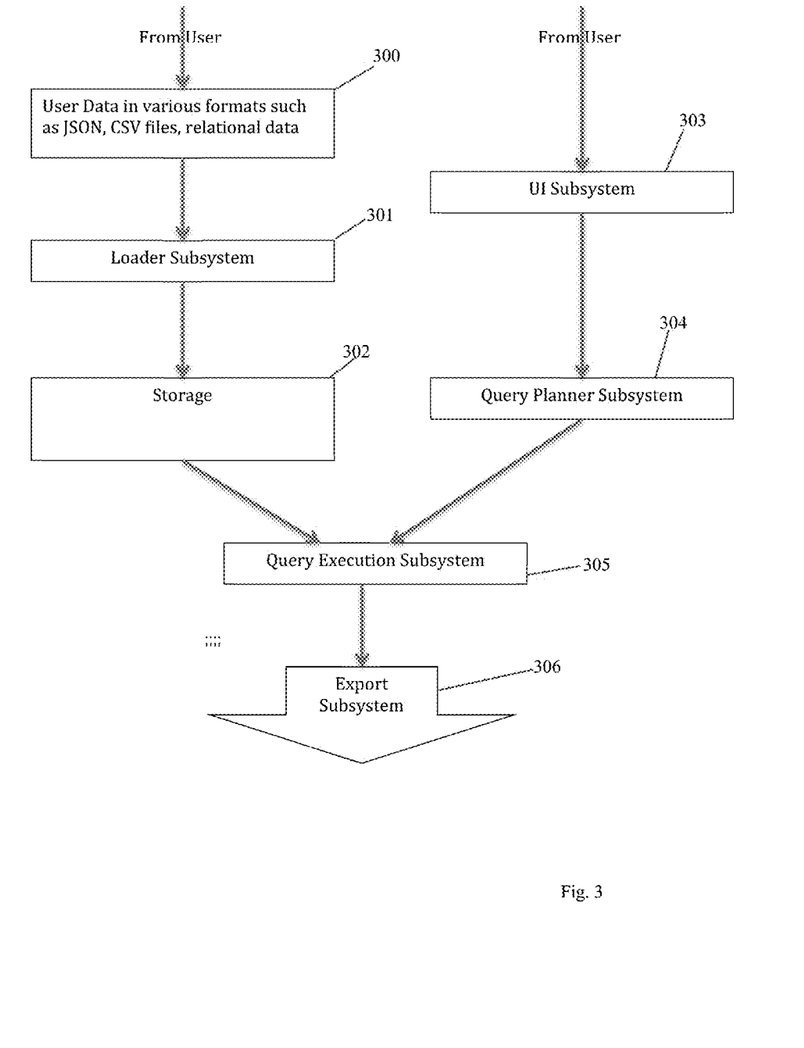
FIG. 3 depicts a flow of information in the query server of FIG. 2.

FIG. 3 depicts a flow of information in the query server of FIG. 2. Referring to FIGS. 1-3, a user provides user data in various formats for performing the desired query, including JSON data collections, CSV files, and conventional relational data, as depicted at step 300. A loader subsystem 301 organizes the data for usage in subsequent queries, such as by removing delimiters and indexing fields. The storage subsystem 302 stores the data, which may include collections of unstructured data as a large working string of Unicode characters or data items. The user also employs a UI subsystem 303 which receives the user query request 126 via the GUI 114. A query planner subsystem 304 processes the query request 126 to organize the portions 131 of the data collection 130 and the match terms 133 or other data receivable by the operations 152 in the high speed memory 162. A query execution subsystem 305 defined by a plurality of GPU 150 cards installed in the query server 118 executes the query request 126, and an export subsystem 306 renders a result to the user.

In the disclosed approach, the above subsystems and steps operate as follows.

A storage subsystem and the storage streaming subsystem is responsible for efficient storage of the data in a way that can be efficiently used for massive parallel computation and for streaming this data into the compute/execution subsystem.

A loader subsystem is responsible for populating the storage subsystem with data provided by users in varied formats, and doing this in a parallel fashion to allow massive data loads in short periods of time.

A user interface subsystem includes a GUI, a CLI (Command Line Interpreter) and a set of APIs through which users, admins and other tools can interact with the system.

A query planner subsystem is responsible for converting the user requests to a set of instructions for the query execution and compute subsystem and the storage streaming subsystem.

A query execution and compute subsystem is responsible for making use of the massive-parallel GPUs in order to produce responses quickly by applying the operators in parallel to high-volume streams.

An export subsystem is responsible for outputting results in various formats that can be consumed by other tools and systems In order to support all types of data (structured, unstructured and semi-structure), the system saves data as a forest—a sequence of trees supporting scalars, sequences, and structures. This is similar to a hybrid of JSON-oriented systems and schema-less column stores. The storage method however is optimized for Big Data queries and analysis.

The system as depicted in FIG. 3 can consume many data formats and all are loaded and converted into these trees. These trees are stored in memory or in the storage subsystem in a block columnar structure that allows for good compression, fast reads and co-location of data that will have to be operated-on together.

Figure 4:
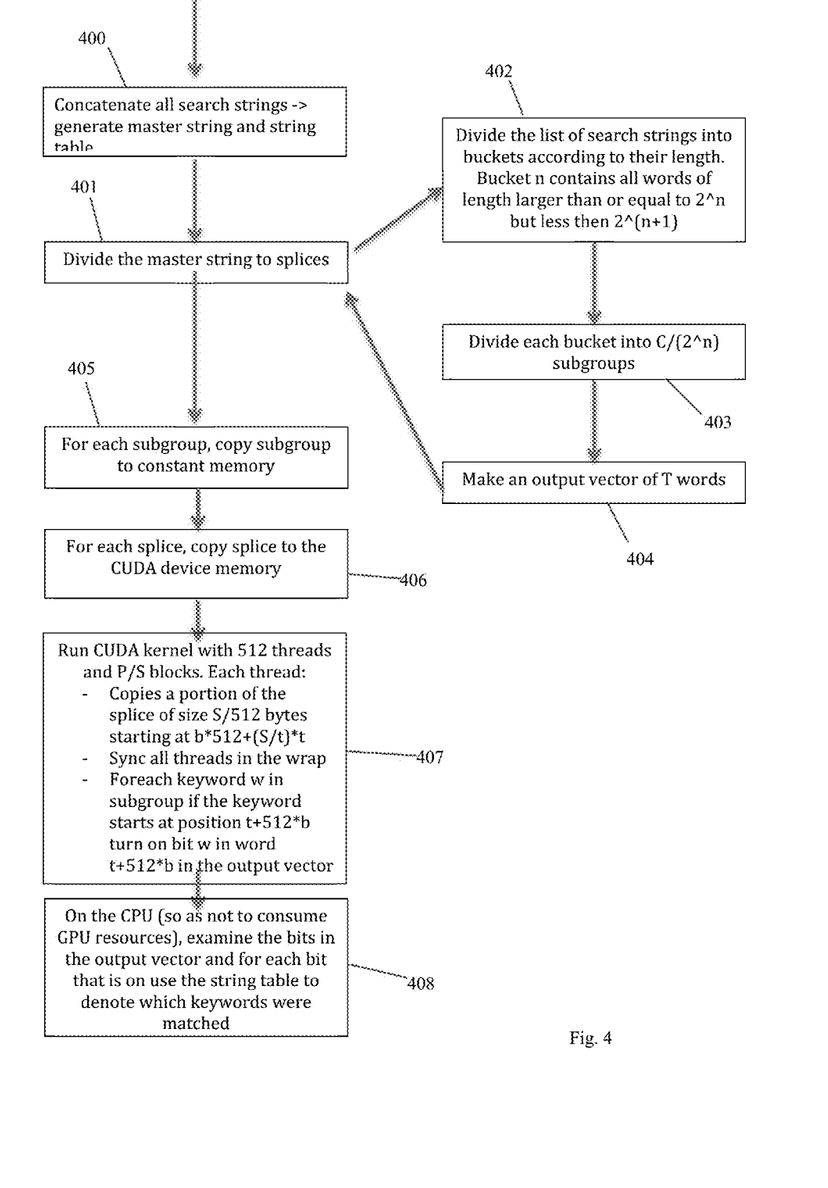
FIG. 4 is a flowchart of query processing by the query server of FIG. 3.

FIG. 4 is a flowchart of query processing by the query server of FIG. 3 for the matching problem. Referring to FIGS. 1, 2 and 4, FIG. 4 depicts an example implementation of the algorithm for filtering using the GPUs. Since there are multiple applications of the algorithm/methods, the disclosed approach is an example for processing a list of strings where the goal is to find those who contain given keywords.

The following is received as input:

a. List of W keywords, for example, {"Pizza", "Pasta", ... }. This is the set of words that need to be matched/searched-for within the list of data elements.

b. List of strings V. The total length of all strings is U. for example:

1. "I like Pizza"
2. "I like Pasta"
3. "I can even eat a little deer"

The resultant output indicates, for each string in the input set V, which keyword it contains, if any. In the example above, string 1 contains the keyword "pizza", string 2 contain the keyword "pasta" and string 3 contains no keywords. This may be in the form of an output vector indicating byte positions of the start of the match terms in the list of strings.

In operation, the following steps are performed:

A. Assumptions and Definitions

1. The longest keyword is has less than $2^N$ bytes. In the example, N is 3. N can be computed from the set V or received as input.
2. The CUDA device supports Constant Memory of up to $C<2^N$ bytes.
3. The CUDA device supports up to S bytes of Shared Memory.

B. Preparations and Initialization

1. Concatenate all input string into one long string, keeping a string table that recalls where each strings begins and end, as depicted at step 400. Such an all-containing string the master string. In the disclosed example, the master string is "I like pizzaI like PastaI can even eat a little deer" and the string table is (0,12,24,35). Denote the overall length of the master string as T. The input data is therefore a string of fixed length data items each having a common size, such as a Unicode string of characters (single bytes). Therefore, the server 118 receives an encoded string of characters having fields denoted by delimiters, and generates the source string, or master string, of delimiterless input data by removing the characters denoting delimiters to generate the source string of concatenated data. The concatenated data therefore contains only the basic data items, without any metadata indicators or field indications that are often used for conditional operations. Such a columnar (i.e. a single column) form lends itself well to processing with a linear sequence of code by GPUs because the code need not identify and branch to separate out individual fields. The resulting string of concatenated data is a sequence of Unicode characters, in the example arrangement, but other forms of a linear sequential structure may also be employed. The string table results from computing field location information from a position of delimiters in the input source, and is used for mapping locations of the computed field locations based on the result. This concatenation also has the effect of flattening the input data to a sequence of atomic fields, such that the location information is indicative of the atomic fields. The atomic fields ensure that each field can be compared with the high-speed memory for determining matches, thus removing hierarchical structures and nested compound fields that would complicate a comparison of field values.

2. Divide this master string to splices, each of length lesser than what can fit into the CUDA main memory, as shown at step 401. The splice should not fall in the middle of one of the original string.

3. Scan the list of keywords and sort them into N different buckets numbered 0, . . . , N−1, as depicted at step 402. Bucket n<N contains those keywords that are longer or equal to $2^n$ but shorter than $2^{(n+1)}$. In our case, there is just one bucket for $2^3$ with three keywords in it. (This is done at query plan time)

The buckets therefore subdivide the match terms into manageable sizes for comparison with the portions/splices. The server 118 computing a plurality of buckets of match terms, such that the match terms are responsive to matching operations with the fields of the working string. The server 118 stores each bucket in the high-speed memory 162 for comparison with the portions. If a match is found, the server 118 sets a bit in an output vector corresponding to each matched term, and stores the output vector in the general memory as results for rendering to the user. Note that the bit setting is not performed by conditional comparison and branching, but rather by comparing each Unicode character of the high speed memory 182 (match terms) with the shared memory 160 containing the portions 134. The comparison merely sets a bit if there is a match without executing different branches of code, therefore each GPU 150 performs the same operations 152.

4. Arbitrarily divide the keywords in each bucket n into $C/(2^n)$ subgroups, such that each subgroup is small enough to be contained completely in the constant memory 162, as disclosed at step 403.

5. Make an output vector of T machine words, each word with w bits, as shown at step 404.

C. Processing

In processing the delimiterless string, which represents the unstructured data store to be searched for match terms, the delimiterless input string is a working string having character data, and the high-speed memory is a high-speed comparison memory adapted for character matching. The server 118 stores a portion, defined as splices (above), of the working string in the shared memory 160, such that the high-speed memory 162 is responsive to the shared memory for data comparisons, and iteratively stores successive portions from the working string in the shared memory for data comparisons. The size of the portions 134 are determined by the size of the shared memory 160. In a typical configuration, the shared memory may be only 64K, so it is most efficient if the portions are sized to utilize as much of the 64K per iteration as possible. The server 118 defines a string table indicative of an offset of each field in the working string based on positions of delimiters in the input source, and then subdivides the working string into portions defined by splices of the delimiterless input data containing sequences of whole fields sized to fit in the shared data 160.

1. For each subgroup:
 a. Copy the subgroup to the constant memory 162, as disclosed at step 405.
 b. For each splice (say the splice size is P)
  i. Copy the splice to the CUDA device memory, as depicted at step 406.
  ii. Run a CUDA kernel with 512 threads and P/S blocks. Each thread runs the following algorithm. (Each thread has an ID t between 0 and 511 and is running in a block b between 0 and P/S−1.). All threads and all blocks execute completely concurrently from now on—the following happens P times at once:
   1. Each thread copies a portion of the splice, of size S/512 bytes, starting at b*512+(S/t)*t
   2. Synchronize all threads in the wrap.
   3. For each keyword w in the subgroup, If the keyword starts at position t+512*b, turn on bit w in word t+512*b in the output vector. (note this happens P times—exactly the length of the portion), as depicted at step 407 for each slice of step 406.
  iii. On the CPU now, examine the bits in the output vector. For each bit that is on, examine the string table to see what string had that keyword inside. For the example above, bit 7 will be on, so "Pizza" was found, depicted by the starting data entity of the match, as depicted at step 408.

In the operations depicted above, the general memory is a solid state memory coupled to the host processor 134 for receiving the input data. The server 118 invokes the plurality of cores and renders the result to the user. In the example configuration, the plurality of cores are graphical processing units (GPUs) 150 responsive to the host processor, the high speed memory 162 is a read only memory configured by the host processor prior to invoking the plurality of cores, and the shared memory 160 is accessible in parallel by each of the cores for performing high-speed operations with the high speed memory.

In leveraging the GPU processing for maximum efficiency, it is expected that the operations performed on the data in the high-speed memory are defined by non-branching instructions, such that the non-branching instructions are devoid of conditional decision paths. A linear execution path allows the GPUs to perform their instruction sequence much faster than if branching and decision points are involved.

For the grouping problem, suppose we have N records. Each record is composed of several fields. For example, each record represents a customer, and in it, we have five fields: Name, Amount Spent, Street Address, City and State. It is a common operation in information systems to group together all records that have a fields in common. In our example, to group together all customers living in the same state. This is usually done for analytic purposes. In our example, calculate the average of spending, by customer per state.

For efficient preparation for the GPU, we pre-sort and store all records sorted according to all possible fields. In this case, the grouping operation is very simple, since all similar records are given one after the other without need to do any search. However, if N is large, the records are divided to B blocks. Each block is sorted, internally, but not across blocks. Our goal is to find the overall unique field values (the "group value", e.g. "NY") and for each record, which group it belongs to (e.g. which customers leave in NY, MA, etc.).

Configurations herein use the GPU to group the records where there are multiple blocks.

Input:

As the blocks are pre-sorted, Inside the Block, for each document we already hold a group number (1, 2, 3, . . . ) which represents which group this record belongs to, and the actual value for the field we group on (e.g "NY").

Ordered Steps:

We maintain a list of the unique group values we already encounter. For each such unique value we assign a running ID, 0, 1, 2, 3, . . . . We start with an empty list. unique_list_length is a variable that contains the number of unique group values we already encounter, which is initially 0.

For each block of the B blocks we have, do the following:

1 create in the GPU memory a vector, a containing the list of unique group values we encountered so far (in the first step, this is empty) followed by all the values in the fields of the documents in the block. Also create an output area, of the same number of elements. The output area is filled with zeros.

2 Note the vector is of length unique_list_length plus the number of records in the current block. We call this length vector_length 3. The mapping stage: Create vector_length GPU processes, all to run in parallel. Each process does the following:

process p scans the vector starting at point p. If it encounters a group value that is identical to the one at position p, that position (say, q) is recorded in the output area at position p and the GPU process stops scanning.

4. the reduce stage: the main CPU process iterates over the output area, over positions 1 to vector_length. Suppose we are at position p. If the number encountered at position p of the output area, let's call it q.

A. If q is not zero, we know that record number q in the block has the same value as the value in position p.
  i. If p is smaller than unique_list_length, we know that record number q in the block belongs to the already existing group number p, which is what we are after.
  ii. Else, we found a new group value. update the list of known unique group value and increment unique_list_length
  iii. However, there might be more records with the same group value, so:
    a. look at the output area at position q, and set q to THAT value, and now we know that record q also have the same group value. Repeat this step (4.A.iii.a) again until q becomes zero.

B. If q is zero,
  i. If p is smaller than unique_list_length, there is nothing to, as this only mean that no record in the current block belong to this group.
  ii. else, we update the list of known unique group value and increment unique_list_length, as we know we found a new value.

Output: unique_list_length, list of unique groups, and which documents belong to which group.

Note the speed of this algorithm is due to step 3, The mapping stage, which is executing in parallel n/2 steps according to a computability that is serially n*log(n).

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A computer program product on a non-transitory computer readable storage medium having instructions that, when executed by a processor, perform a method for querying data, the method comprising:
  transforming a received source of input data into a delimiterless form, the delimiterless input data being a working string having character data;
  iteratively moving portions of the delimiterless input data from a solid-state memory to a shared memory adapted for parallel operations with a plurality of cores;
  storing computational data in a high speed memory responsive to operations with the shared memory, the high-speed memory being a high-speed comparison memory adapted for character matching and the high-speed memory remaining static for the duration of the iterations;
  invoking the plurality of cores for performing the parallel operations on the computational data and the portions of the delimiterless input data;
  storing a portion of the working string in the shared memory, the high-speed memory responsive to the shard memory for data comparisons;
  iteratively storing successive portions from the working string in the shared memory for data comparisons, the portions determined by the size of the shared memory;
  defining a string table indicative of an offset of each field in the working string based on positions of delimiters in the input source;
  subdividing the working string into portions defined by splices of the delimiterless input data containing sequence of whole fields sized to fit in the shard memory;
  storing a result in a general memory accessible from a graphical user interface (GUI); and
  rendering a result to a user indicative of the performed operations.

2. The method of claim 1 further comprising:
  computing a plurality of buckets of match terms, the match terms responsive to matching operations with the fields of the working string;

storing each bucket in the high-speed memory for comparison with the portions;
setting a bit in an output vector corresponding to each matched term; and
storing the output vector in the general memory as results for rendering to the user.

3. The method of claim 1 further comprising performing, by a plurality of GPUs, concurrent matching of different splices on the same bucket, and iteratively advancing through subsequent splices in the working string for comparing each of the match terms with the entire working string.

4. The method of claim 1, wherein the input data is indicative of a unstructured database of a plurality of dimensions, further comprising:
determining a dimensional aspect of the input data; and
computing the splices according to the determined dimensions.

5. A query server comprising:
a loader configured to transform a received source of input data into a delimiterless form;
an I/O interface for iteratively moving portions of the delimiterless input data from a solid-state memory to a shared memory adapted for parallel operations with a plurality of cores;
a plurality of GPU cores configures for storing and processing computational data in a high speed memory responsive to operations with the shared memory, the high-speed memory remaining static for the duration of the iterations;
a general processor for invoking the plurality of cores for performing the parallel operations on the computational data and the portions of the delimiterless input data, the general processor further configured to store a result in a general memory accessible from a graphical user interface (GUI); and
a user output device configured to render the result to a user indicative of the performed operations, the delimiterless input string being a working string having character data, and the high-speed memory is a high-speed comparison memory adapted for character matching, the general processor further configured to:
store a portion of the working string in the shared memory, the high-speed memory responsive to the shared memory for data comparisons;
iteratively store successive portions from the working string in the shared memory for data comparisons, the portions determined by the size of the shared memory.

6. The server of claim 5 wherein the loader is further configured to:
define a string table indicative of an offset of each field in the working string based on positions of delimiters in the input source;
subdivide the working string into portions defined by splices of the delimiterless input data containing sequence of whole fields sized to fit in the shared data.

7. A query server comprising:
a loader configured to transform a received source of input data into a delimiterless form;
an I/O interface for iteratively moving portions of the delimiterless input data from a solid-state memory to a shared memory adapted for parallel operations with a plurality of cores;
a plurality of GPU cores configured for storing and processing computational data in a high speed memory responsive to operations with the shared memory, the high-speed memory remaining static for the duration of the iterations;
a general processor for invoking the plurality of cores for performing the parallel operations on the computational data and the portions of the delimiterless input data, the general processor further configured to store a result in a general memory accessible from a graphical user interface (GUI); and
a user output device configured to render the result to a user indicative of the performed operations, wherein the input data includes strings of data items each having a determined size, the loader further configured to:
compute field location information from a position of delimiters in the input source; and
map locations of the computed field locations based on the result by indexing the delimiterless input data using on the field location information.

8. The server of claim 7 wherein the loader is further configured to:
receive an encoded string of characters having fields denoted by delimiters; and
generate the source string of delimiterless input data by removing the characters denoting delimiters to generate the source string of concatenated data.

9. The server of claim 8 wherein the general memory is a solid state memory coupled to a host processor for receiving the input data, invoking the plurality of cores and rendering the result to the user.

10. The server of claim 9 wherein the operations performed on the data in the high-speed memory are defined by non-branching instructions, the non-branching instruction devoid of conditional decision paths.

11. A method for processing unstructured data comprising:
receiving an encoded string of characters having fields denoted by delimiters;
transforming a received source of input data into a delimiterless form, including generating the source string of delimiterless input data by removing the characters denoting delimiters to generate a source string of concatenated data;
iteratively moving portions of the delimiterless input data from a solid-state memory to a shared memory adapted for parallel operations with a plurality of cores;
storing computational data in a high speed memory responsive to operations with the shared memory, the high-speed memory remaining static for the duration of the iterations;
invoking the plurality of cores for performing the parallel operations on the computational data and the portions of the delimiterless input data;
storing a result in a general memory accessible from a graphical user interface (GUI); and
rendering a result to a user indicative of the performed operations.

12. The method of claim 11 wherein the input data is a string of fixed length data items each having a common size.

13. The method of claim 12 further comprising
computing field location information from a position of delimiters in the input source; and
mapping locations of the computed field locations based on the result by indexing the delimiterless input data using on the field location information.

14. The method of claim 13 further comprising flattening the input data to a sequence of atomic fields, the location information indicative of the atomic fields.

15. The method of claim 11 wherein the string of concatenated data is a sequence of unicode characters in a columnar form.

16. The method of claim 11 wherein the general memory is a solid state memory coupled to a host processor for receiving the input data, invoking the plurality of cores and rendering the result to the user.

17. The method of claim 16 wherein:
the plurality of cores are graphical processing units (GPUs) responsive to the host processor;
the high speed memory is a read only memory configured by the host processor prior to invoking the plurality of cores; and
the shared memory is accessible in parallel by each of the cores for performing high-speed operations with the high speed memory,
8 wherein the operations performed on the data in the high-speed memory are defined by non-branching instructions, the non-branching instruction devoid of conditional decision paths.

18. The method of claim 11 further comprising:
obtaining the input data from a JSON (JavaScript Object Notation) database having an unstructured form; and
invoking a plurality of GPU (Graphical Processing Unit) cores for performing parallel processing of JSON data.

* * * * *